April 7, 1953 E. D. GOODALE ET AL 2,634,328
TELEVISION SYSTEM
Filed June 27, 1947
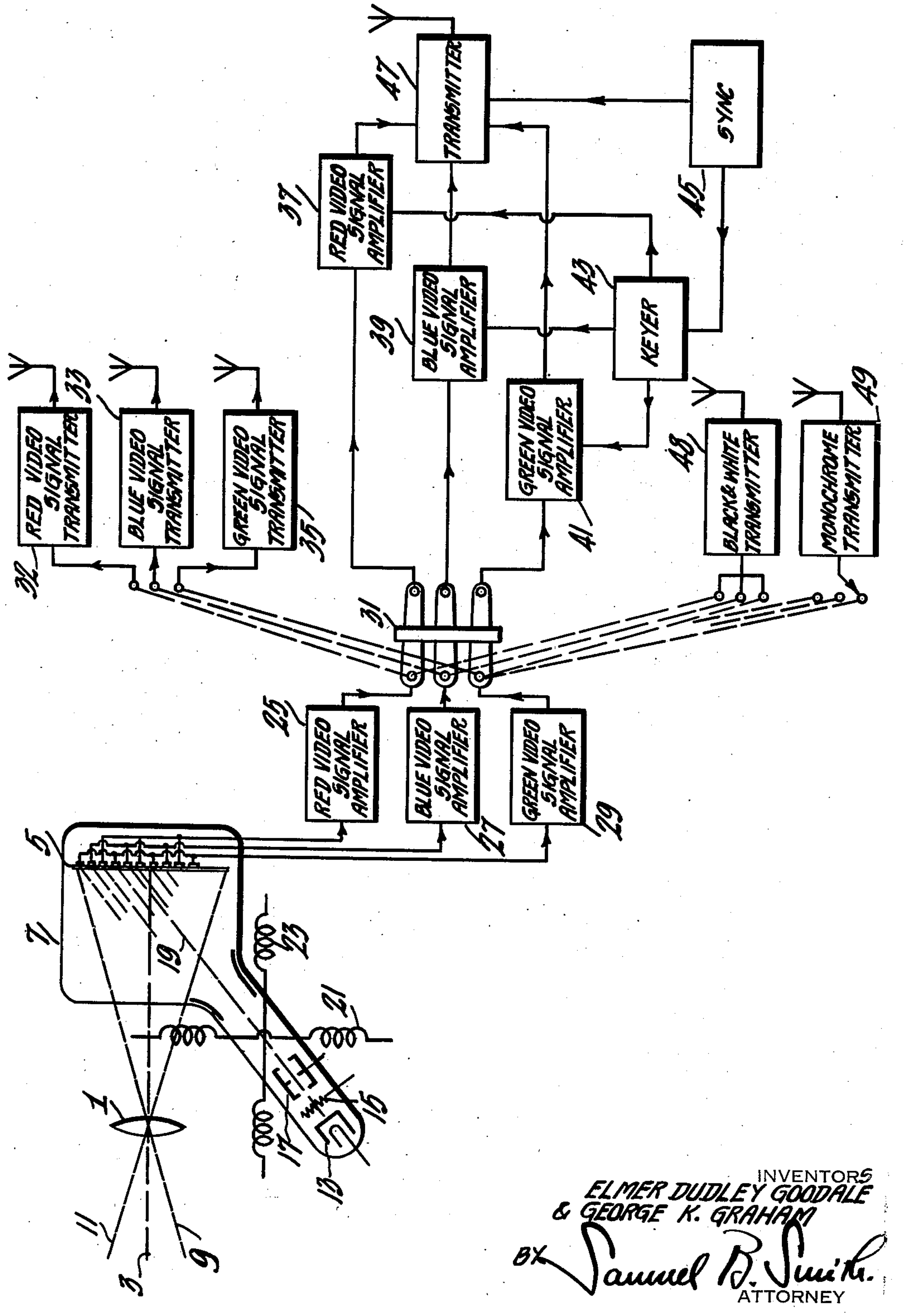
INVENTORS
ELMER DUDLEY GOODALE
& GEORGE K. GRAHAM
BY Samuel B. Smith
ATTORNEY Patented Apr. 7, 1953

2,634,328

UNITED STATES PATENT OFFICE 2,634,328

TELEVISION SYSTEM

Elmer Dudley Goodale, New Rochelle, and George K. Graham, Oceanside, N. Y., assignors to Radio Corporation of America, a corporation of Delaware Application June 27, 1947, Serial No. 757,634

5 Claims. (Cl. 178—5.4)

This invention relates to color television and more particularly to arrangements adaptable for use in any of the well known systems such as the simultaneous type color system, the sequential type color system, black and white, or monochrome.

In each of the systems proposed for the transmission of television images in either black and white or in color, the image is analyzed by dividing it into elemental areas which are selected from the complete image or image area in an orderly sequence by a process of scansion to produce signal indications which may then be transmitted one after another in the form of a video signal train. Because of the fact that the scanning and image repetition processes are essentially artificial ones, it is therefore possible to choose any arbitrary scanning pattern so long as the scanning pattern used at the receiver or monitoring point is made to correspond to that employed at the transmitter.

As is well known in the art, the reproduction of television images in substantially their natural color can be accomplished by additive methods and by transmitting signals representative of the image in each of a selected number of primary or component colors which, for example, are three in number for a tricolor system or which may include, where desired, a black and white signal addition known as a key image to sharpen outlines or, for a lower degree of fidelity of color representation, even a bicolor system might be adopted. For any of these methods, however, the several produced component color signal series may be transmitted simultaneously when a simultaneous multicolor method is adopted, or may be transmitted in sequence where a sequential additive method is employed.

In either the simultaneous or sequential processes of color image transmission referred to, the component colors into which the image is analyzed are usually chosen as red, blue and green. The addition of these several color images at the receiving points when a scanning operation similar to that occurring at the transmitter station is adopted causes the resultant viewed image replica to appear in substantially the true and natural color in which it appeared at the transmitter point.

As is well known in the art, the simultaneous type transmission of color images provides for continuous transmission of the video signal trains representative of each of the component colors.

A typical simultaneous type system is shown and described in an article entitled "Simultaneous all-electronic color television" beginning on page 459 of the "RCA Review" for December 1946.

The transmission by the so-called sequential process is usually accomplished through the use of moving color filters which are selected from the three primary or component colors which serve to provide the color separation when these component color filters have been positioned in the optical path along which the image is directed to the transmitting camera tube and are changed from one to another color at a rapid rate. At the receiving end of the system, a like set of filters to that of the transmitter is located in the optical path between the image reproducing tube and the observer. The filters at each of the transmitter and receiver reveal the image to the camera tube in sequence in its different component colors.

A typical sequential color type system is shown and described in an article entitled "An experimental color television system" by R. D. Kell, G. L. Fredendall, A. C. Schroeder, and R. C. Webb, beginning on page 141 of the "RCA Review" for June 1946.

In each of the fundamental type systems referred to, it has been customary to employ a storage type camera tube such as, for example, the iconoscope, the image iconoscope, the orthicon, or the image orthicon.

The principle of light storage employed in transmitter tubes such as the iconoscope and the like involves setting up a flat plate termed the target electrode, the surface of which is illuminated by the scene to be transmitted, the image of which is focused upon the target electrode mosaic. The flat surface contains a coating of globules of insulated photosensitive material. The photosensitivity characteristic is employed to release electrons from the surface in the form of an electron image. The electron image is not utilized directly, but is allowed to dissipate itself within the tube, the electrons being collected by an electrode and removed from the tube without further use.

The insulation characteristic of the surface is employed to preserve the configuration of the charge deficiency on the plate. This conservation of charge continues for as long as is required. Consequently, the light is effectively stored in the form of stored charges, the distribution of which corresponds to that of the light in the scene to be transmitted. When the electron scanning beam passes over a picture element, it makes use not only of the light which illuminates the element at that instant, but also of the light which has fallen on that element since the previous passage of the scanning beam. It may therefore be considered that each globule in the mosaic surface of the iconoscope is a miniature photo tube cathode. Each cathode is coupled to the external circuit through the electrical capacitance between the globule and the signal coating or conducting layer on the reverse side of the flat plate. The capacitance becomes charged when the globule loses electrons under the influence of the illumination on it. The action of the scanning beam is to replace the lost charge on each globule and the capacitance thereby becomes discharged at a much more rapid rate than that at which it was charged. The sudden discharge acting through the capacitance through the signal coating appears as a current impulse in the signal circuit connected to the signal coating.

The transmitter tube referred to above employs a single target electrode which restricts its use, therefore, to only one at a time of the type television systems outlined above, unless complicated arrangements are provided which, for example, might consist of the simultaneous employment of a plurality of such camera tubes for the transmission of color images.

There has been proposed a modified type of transmitter tube involving the use of a plurality of target electrodes, each of the electrodes having a plurality of electrically interconnected elements interpositioned with elements of other of the associated target electrodes and wherein the elements referred to are small enough to be indistinguishable one from another by the unaided human eye. Such a transmitter tube has been shown and described in detail in the Patent No. 2,446,249, dated August 3, 1948 of Alfred C. Schroeder.

According to this invention, a transmitter tube of the type employing a plurality of electrically independent target electrodes, each of the electrodes having a plurality of electrically interconnected conductive elements interpositioned with elements of the other of the associated target electrodes, is arranged to provide independent component color image signal trains for a simultaneous type color image transmission system, a sequential type color image transmission system, a black and white image transmission system, or a monochrome image transmission system, singly, in combination, or selectively, by a novel arrangement including a plurality of independent signal channels.

A primary object of this invention is to provide an improved television system.

Another object of this invention is to provide for improved color image transmission.

Still another object of this invention is to provide a novel arrangement for the transmission of images with a single camera tube and at the same time over the simultaneous type color image system, the sequential color system, black and white system and the monochrome system.

Still another object of this invention is to provide a novel switching arrangement for the selective operation of any of the well known types of color transmission systems.

Other and incidental objects of the invention will be apparent to those skilled in the art from a reading of the following specification and an inspection of the accompanying drawing, which represents by block diagram a preferred form of this invention.

Referring now in detail to the drawing, objective lens 1 on optical axis 3 focuses the light image of external subjects on the mosaic electrode 5 of the iconoscope or other suitable camera tube 7. 9 and 11 represent typical rays passing through lens 1.

An electron gun consisting of a cathode 13, a control electrode 15 and electrode 17 provides for the generation and focusing of an electron beam 19 which is directed to target 5 and made to scan the target 5 in a predetermined raster by the magnetic deflection coils 21 and 23. The electrical connections for the electron gun and the deflection coils are not illustrated in this drawing, as such subject matter is not part of this invention and is generally well known in the art. The generation and deflection of the electron beam are shown in detail in the published art such as, for example, the U. S. patent to R. C. Ballard, No. 2,152,234, dated March 28, 1939, relating to interlaced scanning; the U. S. patent to W. A. Tolson, No. 2,167,379, dated July 25, 1939, relating particularly to electromagnetic deflecting coils; and U. S. patent to W. A. Tolson et al., No. 2,101,520, dated December 7, 1937, and relating to synchronous deflection signal generating systems.

Electron gun structure and operation is well explained in an article entitled "Improved electron gun cathode ray tubes," by L. E. Swedlund, published in "Electronics" for March 1946.

The operation of the iconoscope is well known in the art. An explanation of its operation may be found in an article entitled "Theory and performance of the iconoscope," by V. K. Zworykin, G. A. Morton and L. E. Flory, published in the "Proceedings of the Institute of Radio Engineers" for August 1937.

An important difference between the camera tubes employed in present day systems and the camera tubes used in the practice of this invention resides primarily in the structure of the target electrode 5.

According to the form of target electrode 5 shown and described in the Patent No. 2,446,249 dated August 3, 1948, of Alfred C. Schroeder, and referred to above, the target electrode 5, rather than consisting of a solid electrode plate, is composed of a plurality of electrically independent target electrodes, each of the target electrodes having a plurality of electrically interconnected conductive elements interpositioned with elements of other of the target electrodes, and wherein the elements are small enough that they are indistinguishable one from another by the unaided human eye. The elements are also small enough, for example, that at least three different electrodes intercept the scanning beam 19 at any one time. It will be seen upon examination of the enlarged view of electrode 5 that it consists of a plurality of independent elemental areas. Every third element is connected together and connected to a separate signal amplifier designated as red video signal amplifier 25, blue video signal amplifier 27, and green video signal amplifier 29. Amplifiers of a suitable type are shown and described in an article entitled "An iconoscope pre-amplifier," by A. A. Barco, in "RCA Review" for July 1939.

It will be seen that if the structure of electrode 5 is made in accordance with the teachings of the Schroeder application referred to above, the target electrode 5 will consist of an insulating plate, such as thin mica, having a mosaic on one side and a plurality of strips of color filter on the side toward the image. The strips of color filter may, for example, be red, green, and blue arranged in continual sequence from one edge of the target electrode 5 to the other edge and extending, for example, horizontally, as illustrated. On the back are metal conducting strips, each acting as a signal plate for the opposite strip of mosaic element. These strips are spaced, or otherwise insulated from each other. The conducting strips on the filter of one color, that is, red, all are connected in parallel to a lead wire extending outside the tube to the red video signal amplifier 25. The conducting strips of another color filter, such as blue, are similarly connected in parallel to another conductor through blue video signal amplifier 27, and the conducting strips of the green color filter are in turn connected to the third channel involving the green video signal amplifier 29.

The output signal train from each of the amplifiers 25, 27 and 29 are transmitted to separate channels through switching device 31, which may select any one of the various type equipments illustrated, such as, for example, a simultaneous system in the upper position, including a red video signal transmitter 32, a blue video signal transmitter 33, and a green video signal transmitter 35. These transmitters may be completely independent or they may, as is well known in the art, be of the type wherein three different carriers are separately modulated over a single signal channel.

The switch 31 in the position shown permits the sequential type transmission involving the red video signal amplifier 37, the blue video signal amplifier 39, and the green video signal amplifier 41, which are sequentially keyed by keyer 43 driven in predetermined synchronism by the source of signals 45. The signal trains derived from amplifiers 37, 39 and 41 are combined and broadcast in transmitter 47.

It will be seen that the employment of this invention is particularly applicable to providing for flexible sequential systems wherein, for example, the frequency of recurrence of the individual component color signal trains may not necessarily be limited in accordance with field frequency or a multiple thereof, as is necessary in mechanical sequential systems, but may take any desired ratio.

If switch 31 is thrown to the position of the black and white transmitter 48, it will be seen that all the component color signals will be combined to form a composite signal which will result in a black and white image at the receiver.

In one preferred form of this invention, it is proposed to directly connect all the target electrodes together before transmission through amplifiers 25, 27 and 29, however, it will be seen that combining the signal energy of all the signal channels after the signals have passed through the amplifiers 25, 27 and 29 will permit individual gain control in each of the component color signal channels, and thus permit color sensitivity correction of the system.

It may become desirable to transmit a signal train representative of a single component color. This may be accomplished by dropping the switch 31 to the lowest position and selecting the desired single channel for the monochrome transmitter 49.

According to still another preferred form of this invention, it is proposed to connect the transmitter tube 7 and its associated amplifiers 25, 27 and 29 to any combinations of the type systems shown for simultaneous transmission.

Having thus described the invention, what is claimed is:

1. A television transmitting system comprising in combination an image pick up tube of the type having a multiple target electrode responsive independently to different colors, means for simultaneously scanning different color responsive portions of said target, a different signal transmission channel connected to each of said target electrodes, and means to control the operation of each of said signal transmission channels independent of each other.

2. A convertible television transmission system comprising an image pickup tube of the type having a plurality of electrically independent color light responsive target electrodes, each of said electrodes having a plurality of electrically interconnected conductive elements interpositioned with elements of other of said target electrodes, said elements being small enough to be indistinguishable one from another by the unaided human eye, a separate signal amplifier channel connected to each of said target electrodes, and means to control the operation of each of said signal amplifier channels independent of each other.

3. A color television transmitting system comprising an image pickup tube of the type having an electron scanning beam and a plurality of electrically independent target electrodes, each of said electrodes having a plurality of electrically interconnected conductive elements interpositioned with elements of other of said target electrodes, said elements being sufficiently small that at least three different electrodes intercept the scanning beam at a time, each of said electrodes having associated therewith component color filters to make each of said electrodes responsive to a component color light, a separate signal transmission channel connected to each of said target electrodes, and means to control the operation of each of said signal transmission channels independent of the other and in combination.

4. A color television transmitting system comprising an image pickup tube of the type having an electron scanning beam and a plurality of electrically independent target electrodes, each of said electrodes having a plurality of electrically interconnected conductive elements interpositioned with elements of other of said target electrodes, each of said electrodes having associated therewith different component color filters to make each of said electrodes responsive to a different component color light, a simultaneous type television radio transmitter having a plurality of component color signal input channels, a sequential type television transmitter having a plurality of component color signal input channels, and a connection between each of said component color signal channels and its associated color selective electrode.

5. A color television transmitting system comprising an image pickup tube of the type having an electron scanning beam and a plurality of electrically independent target electrodes, each of said electrodes having a plurality of electrically interconnected conductive elements interpositioned with elements of other of said target electrodes, each of said electrodes having associated therewith component color filters to make each of said electrodes responsive to a different component color light, a simultaneous type television radio transmitter having a plurality of component color signal input channels, a sequential type television transmitter having a plurality of component color signal input channels, and a selective connection between the component color signal input channels of one of said transmitters and its associated color responsive electrodes.

ELMER DUDLEY GOODALE.
GEORGE K. GRAHAM.

REFERENCES CITED

The following references are of record in the file of this patent:

UNITED STATES PATENTS

| Number | Name | Date |
|---|---|---|
| 2,120,765 | Orvin | June 14, 1938 |
| 2,253,292 | Goldsmith | Aug. 19, 1941 |
| 2,294,820 | Wilson | Sept. 1, 1942 |
| 2,307,188 | Bedford | Jan. 5, 1943 |
| 2,310,863 | Leverenz | Feb. 9, 1943 |
| 2,335,180 | Goldsmith | Nov. 23, 1943 |
| 2,385,563 | Beers | Sept. 25, 1945 |
| 2,423,769 | Goldsmith | July 8, 1947 |
| 2,423,770 | Goldsmith | July 8, 1947 |
| 2,446,440 | Swedlund | Aug. 3, 1948 |
| 2,521,010 | Homrighous | Sept. 5, 1950 |